United States Patent
Okawachi et al.

(10) Patent No.: US 10,669,439 B2
(45) Date of Patent: Jun. 2, 2020

(54) RESIN FOR ACTIVE ENERGY RAY CURABLE INK, COMPOSITION FOR ACTIVE ENERGY RAY CURABLE INK, ACTIVE ENERGY RAY CURABLE INK, AND CURED FILM

(71) Applicant: Harima Chemicals, Incorporated, Kakogawa-shi, Hyogo (JP)

(72) Inventors: Keijiro Okawachi, Hyogo (JP); Keiji Sasakura, Hyogo (JP); Tomoya Tanatsugu, Hyogo (JP); Hiroyuki Hisada, Hyogo (JP); Akihiro Morita, Hyogo (JP)

(73) Assignee: HARIMA CHEMICALS, INCORPORATED, Kakogawa-Shi, Hyogo (JP)

( * ) Notice: Subject to any disclaimer, the term of this patent is extended or adjusted under 35 U.S.C. 154(b) by 0 days.

(21) Appl. No.: 16/320,304

(22) PCT Filed: Jul. 13, 2017

(86) PCT No.: PCT/JP2017/025521
§ 371 (c)(1),
(2) Date: Jan. 24, 2019

(87) PCT Pub. No.: WO2018/021045
PCT Pub. Date: Feb. 1, 2018

(65) Prior Publication Data
US 2019/0264044 A1    Aug. 29, 2019

(30) Foreign Application Priority Data
Jul. 26, 2016  (JP) .................. 2016-146312

(51) Int. Cl.
| | |
|---|---|
| *C08F 2/50* | (2006.01) |
| *C08F 2/46* | (2006.01) |
| *C08G 61/04* | (2006.01) |
| *C09D 11/101* | (2014.01) |
| *C08G 63/91* | (2006.01) |
| *C08L 93/04* | (2006.01) |
| *C09D 11/104* | (2014.01) |
| *C08K 3/013* | (2018.01) |

(52) U.S. Cl.
CPC .......... *C09D 11/101* (2013.01); *C08G 63/918* (2013.01); *C08L 93/04* (2013.01); *C09D 11/104* (2013.01); *C08K 3/013* (2018.01)

(58) Field of Classification Search
CPC .... C09D 11/101; C09D 11/104; C08K 3/013; C08L 93/04; C08G 63/918

USPC .................................................. 522/1; 520/1
See application file for complete search history.

(56) References Cited

FOREIGN PATENT DOCUMENTS

| JP | 06041486 A | 2/1994 |
|---|---|---|
| JP | 2001139670 A | 5/2001 |
| JP | 2003268283 A | 9/2003 |
| JP | 2004-245716 | * 9/2004 |
| JP | 2004256716 A | 9/2004 |
| JP | 2004-352877 | * 12/2004 |
| JP | 2004352877 A | 12/2004 |
| JP | 2006160806 A | 6/2006 |
| JP | 2007231220 A | 9/2007 |
| JP | 2010070742 A | 4/2010 |
| JP | 2011074112 A | 4/2011 |
| JP | 2016000764 A | 1/2016 |
| WO | 2014024549 A1 | 2/2014 |

OTHER PUBLICATIONS

Toyoda et al, JP 2004-256716 Machine Translation, Sep. 16, 2004 (Year: 2004).*
Natsuhara et al, JP 2004-352877 Machine Translation, Dec. 16, 2004 (Year: 2004).*
PCT International Preliminary Report on Patentability (IPRP) and Written Opinion dated Feb. 7, 2019, in corresponding International Application No. PCT/JP2017/025521 (11 pages).
International Search Report (PCT/ISA/210) dated Aug. 15, 2017, by the Japanese Patent Office as the International Searching Authority for International Application No. PCT/JP2017/025521.
Written Opinion (PCT/ISA/237) dated Aug. 15, 2017, by the Japanese Patent Office as the International Searching Authority for International Application No. PCT/JP2017/025521.

* cited by examiner

*Primary Examiner* — Jessica Whiteley
(74) *Attorney, Agent, or Firm* — Buchanan Ingersoll & Rooney PC

(57) ABSTRACT

A resin for an active energy ray curable ink contains a rosin-modified unsaturated polyester resin (A). The rosin-modified unsaturated polyester resin (A) is a reaction product of a material component containing rosins (a), $\alpha,\beta$-unsaturated carboxylic acids (b), and polyols (c); the mole ratio of an unsaturated bond based on the $\alpha,\beta$-unsaturated carboxylic acids (b) with respect to the total amount of the material component is 0.50 mol/kg or more and 2.00 mol/kg or less; the rosins (a) contain a stabilization-treated rosin at a ratio of 90 mass % or more with respect to the total amount of the rosins (a); the $\alpha,\beta$-unsaturated carboxylic acids (b) contain $\alpha,\beta$-unsaturated dicarboxylic acids; and the polyols (c) contain a trihydric or more alcohol.

9 Claims, No Drawings

RESIN FOR ACTIVE ENERGY RAY CURABLE INK, COMPOSITION FOR ACTIVE ENERGY RAY CURABLE INK, ACTIVE ENERGY RAY CURABLE INK, AND CURED FILM

TECHNICAL FIELD

The present invention relates to a resin for an active energy ray curable ink, a composition for an active energy ray curable ink, an active energy ray curable ink, and a cured film.

BACKGROUND ART

Conventionally, for example, an active energy ray curable ink that cures by an active energy ray such as ultraviolet ray and electron ray has been used for printed matters in various industrial fields.

To be specific, as the active energy ray curable ink, an active energy ray curable lithography ink containing (a) a resin, (b) an active energy ray curable compound, and (c) a pigment has been proposed in which (a) the resin is obtained by subjecting a resin acid to addition reaction with an $\alpha,\beta$-unsaturated carboxylic acid or an anhydride thereof in an amount of 50 to 100 mol % with respect to the resin acid, and furthermore, being reacted with a polyhydric alcohol to be synthesized; (a) the resin is contained at a ratio of 10 to 40 weight % with respect to the total amount of the ink; (b) the active energy ray curable compound is contained at a ratio of 30 to 75 weight % with respect to the total amount of the ink; and (c) the pigment is contained at a ratio of 5 to 40 weight % with respect to the total amount of the ink. Also, it has been disclosed that in the active energy ray curable lithography ink, the resin acid to be used desirably contains a conjugated double bond-containing compound at a ratio of 50% or more.

To be more specific, it has been proposed that a resin is obtained by allowing a rosin to react with a maleic anhydride and then, adding a benzoic acid, a phthalic anhydride, a trimethylolpropane, and a p-toluenesulfonic acid monohydrate thereto to be subjected to dehydration condensation; a varnish is obtained by mixing the obtained resin with a dipentaerythritol hexaacrylate or the like; and furthermore, a lithography ink is obtained by using the obtained varnish (ref: Patent Document 1 (Example 1)).

CITATION LIST

Patent Document

Patent Document 1: Japanese Unexamined Patent Publication No. 2010-70742

SUMMARY OF THE INVENTION

Problem to be Solved by the Invention

Meanwhile, there is a disadvantage that the varnish described in Patent Document 1 does not have sufficient storage stability. Also, there is a disadvantage that in the active energy ray curable lithography ink obtained by using the varnish, the reactivity of (a) the resin with (b) the active energy ray curable compound (monomer) is not sufficient, and as a result, the mechanical strength of a film (cured film) that cures by the active energy ray is not sufficient.

The ink is required to suppress scattering (misting resistance) at the time of its use, and furthermore, to have glossiness, durability (abrasion resistance or the like), or the like of the cured film in accordance with its use.

An object of the present invention is to provide a resin for an active energy ray curable ink having excellent misting resistance and storage stability, and capable of obtaining a cured film having excellent mechanical strength, glossiness, and durability (abrasion resistance or the like); a composition for an active energy ray curable ink containing the resin for an active energy ray curable ink and a cured film thereof; and furthermore, an active energy ray curable ink containing the composition for an active energy ray curable ink and a cured film thereof.

Means for Solving the Problem

The present invention [1] includes a resin for an active energy ray curable ink containing a rosin-modified unsaturated polyester resin (A), wherein the rosin-modified unsaturated polyester resin (A) is a reaction product of a material component containing rosins (a), $\alpha,\beta$-unsaturated carboxylic acids (b), and polyols (c); the mole ratio of an unsaturated bond based on the $\alpha,\beta$-unsaturated carboxylic acids (b) with respect to the total amount of the material component is 0.50 mol/kg or more and 2.00 mol/kg or less; the rosins (a) contain a stabilization-treated rosin at a ratio of 90 mass % or more with respect to the total amount of the rosins (a); the $\alpha,\beta$-unsaturated carboxylic acids (b) contain $\alpha,\beta$-unsaturated dicarboxylic acids; and the polyols (c) contain a trihydric or more alcohol.

The present invention [2] includes the resin for an active energy ray curable ink described in the above-described [1], wherein the content ratio of $\alpha,\beta$-unsaturated monocarboxylic acids with respect to the total amount of the $\alpha,\beta$-unsaturated carboxylic acids (b) is 3 mass % or less.

The present invention [3] includes the resin for an active energy ray curable ink described in the above-described [1] or [2], wherein the content ratio of a diol with respect to the total amount of the polyols (c) is 10 mass % or less.

The present invention [4] includes the resin for an active energy ray curable ink described in any one of the above-described [1] to [3], wherein the $\alpha,\beta$-unsaturated dicarboxylic acids are at least one compound selected from the group consisting of fumaric acid, maleic acid, and maleic anhydride.

The present invention [5] includes the resin for an active energy ray curable ink described in any one of the above-described [1] to [4], wherein the stabilization-treated rosin is a hydrogenated rosin and/or a disproportionated rosin.

The present invention [6] includes the resin for an active energy ray curable ink described in any one of the above-described [1] to [5], wherein the mass ratio (the $\alpha,\beta$-unsaturated carboxylic acids (b)/the rosins (a)) of the $\alpha,\beta$-unsaturated carboxylic acids (b) with respect to the rosins (a) is 0.35 or more and 2 or less.

The present invention [7] includes a composition for an active energy ray curable ink containing the resin for an active energy ray curable ink described in any one of the above-described [1] to [6] and an active energy ray curable monomer.

The present invention [8] includes an active energy ray curable ink containing the composition for an active energy ray curable ink described in the above-described [7] and a pigment.

The present invention [9] includes a cured film that is a cured product of the composition for an active energy ray curable ink described in the above-described [7].

The present invention [10] includes a cured film that is a cured product of the active energy ray curable ink described in the above-described [8].

Effect of the Invention

The resin for an active energy ray curable ink, the composition for an active energy ray curable ink containing the resin for an active energy ray curable ink, and furthermore, the active energy ray curable ink containing the composition for an active energy ray curable ink of the present invention have excellent misting resistance and storage stability, and are capable of obtaining a cured film having excellent mechanical strength, glossiness, and durability (abrasion resistance or the like).

The cured film of the present invention is a cured product of the composition for an active energy ray curable ink of the present invention or a cured product of the active energy ray curable ink of the present invention, so that it has excellent mechanical strength, glossiness, and durability (abrasion resistance or the like).

DESCRIPTION OF EMBODIMENTS

A resin for an active energy ray curable ink of the present invention contains a rosin-modified unsaturated polyester resin (A), and preferably consists of the rosin-modified unsaturated polyester resin (A).

The rosin-modified unsaturated polyester resin (A) is a reaction product (polymer) of a material component containing at least rosins (a), $\alpha,\beta$-unsaturated carboxylic acids (b), and polyols (c).

The rosins (a) contain, as an essential component, a rosin-modified product in which a natural rosin is subjected to stabilization treatment (hereinafter, referred to as a stabilization-treated rosin).

The natural rosin is a natural resin mainly composed of a resin acid. The resin acid is a compound having a carboxyl group based on plants. To be specific, examples thereof include resin acids having a conjugated double bond such as abietic acid, parastoric acid, neoabietic acid, and levopimaric acid and resin acids without having a conjugated double bond such as dehydroabietic acid, dihydroabietic acid, and tetrahydroabietic acid.

To be more specific, examples of the natural rosin include tall oil rosin, gum rosin, and wood rosin. These natural rosins can be used alone or in combination of two or more. As the natural rosin, preferably, a gum rosin is used.

The stabilization treatment is treatment that reduces or eliminates the conjugated double bond of the above-described resin acid having the conjugated double bond, and to be specific, examples thereof include hydrogenation treatment, disproportionated treatment, and polymerization treatment. Preferably, hydrogenation treatment and disproportionated treatment are used.

In other words, to be specific, examples of the stabilization-treated rosin include hydrogenated rosin in which the natural rosin is subjected to hydrogenation treatment, disproportionated rosin in which the natural rosin is subjected to disproportionated treatment, and polymerized rosin in which the natural rosin is subjected to polymerization treatment. Also, an example of the stabilization-treated rosin includes a hydrogenated product of the polymerized rosin.

These stabilization-treated rosins can be used alone or in combination of two or more.

As the stabilization-treated rosin, in view of mechanical strength, glossiness, and durability (abrasion resistance or the like), preferably, a hydrogenated rosin and a disproportionated rosin are used, more preferably, a disproportionated rosin is used.

The rosins (a) can also contain, as an optional component, a rosin that is not subjected to stabilization treatment (hereinafter, referred to as a non-stabilization-treated rosin).

An example of the non-stabilization-treated rosin includes the above-described natural rosin.

The content ratio of the non-stabilization-treated rosin is within a range that does not damage the excellent effect of the present invention, and to be specific, in view of storage stability, glossiness, mechanical strength, and durability (abrasion resistance or the like), the content ratio of the non-stabilization-treated rosin with respect to the total amount of the rosins (a) is, for example, 10 mass % or less, preferably 5 mass % or less, more preferably 0 mass %. The content ratio of the stabilization-treated rosin with respect to the total amount of the rosins (a) is, for example, 90 mass % or more, preferably 95 mass % or more, more preferably 100 mass %.

In other words, in view of storage stability, glossiness, mechanical strength, and durability (abrasion resistance or the like), particularly preferably, the rosins (a) consist of a stabilization-treated rosin.

When the non-stabilization-treated rosin is excessively used as the rosins (a), for example, there may be a case where the storage stability of a composition for an active energy ray curable ink (described later) and an active energy ray curable ink cannot be sufficiently ensured.

To be more specific, the non-stabilization-treated rosin contains a relatively large amount of resin acid having the conjugated double bond, so that it is easily oxidized. Thus, when the resin for an active energy ray curable ink obtained by excessively using the non-stabilization-treated rosin is used for the composition for an active energy ray curable ink (described later), the composition for an active energy ray curable ink (described later) is brought into a state of easily producing a radical by the formation of a peroxide or the like. As a result, it is presumed that the storage stability is not sufficient such that the composition for an active energy ray curable ink (described later) is easily gelated.

Furthermore, when the non-stabilization-treated rosin is excessively used as the rosins (a), there may be a case where the $\alpha,\beta$-unsaturated carboxylic acids (b) (described later) are added to the rosins (a) by Diels-Alder reaction, and an unsaturated bond based on the $\alpha,\beta$-unsaturated carboxylic acids (b) (described later) in the resin for an active energy ray curable ink cannot be sufficiently ensured. In this case, there may be a case where the reactivity of the resin for an active energy ray curable ink with an active energy ray curable monomer (described later) is reduced, so that the mechanical strength and the durability (abrasion resistance or the like) of a film (cured film) that cures by an active energy ray are not sufficient.

In contrast, in the stabilization-treated rosin, the conjugated double bond is reduced or eliminated. Thus, when the resin for an active energy ray curable ink obtained by using a relatively large amount of stabilization-treated rosin as the rosins (a) is used for the composition for an active energy ray curable ink (described later), the composition for an active energy ray curable ink (described later) is brought into a state of not easily producing a radical. As a result, the improvement of the storage stability can be achieved such that the gelation of the composition for an active energy ray curable ink (described later) is suppressed.

In the stabilization-treated rosin, the double bond used in the Diels-Alder reaction is reduced or eliminated. Thus, when the rosins (a) contain a relatively large amount of stabilization-treated rosin, the addition of the α,β-unsaturated carboxylic acids (b) (described later) with respect to the rosins (a) is suppressed. As a result, the α,β-unsaturated carboxylic acids (b) (described later) are introduced into a main chain of the rosin-modified unsaturated polyester resin (A). Thus, a relatively large amount of unsaturated bond based on the α,β-unsaturated carboxylic acids (b) (described later) is introduced into the rosin-modified unsaturated polyester resin (A). As a result, the reactivity of the resin for an active energy ray curable ink with an active energy ray curable monomer (described later) can be sufficiently ensured, and the improvement of the glossiness, the mechanical strength, and the durability (abrasion resistance or the like) of the film (cured film) that cures by the active energy ray can be achieved.

The content ratio of the rosins (a) with respect to 100 parts by mass of the total amount of the material component is, for example, 1 part by mass or more, preferably 3 parts by mass or more, more preferably 5 parts by mass or more, and for example, 98 parts by mass or less, preferably 60 parts by mass or less, more preferably 50 parts by mass or less.

When the content ratio of the rosins (a) is within the above-described range, excellent glossiness, mechanical strength, and durability (abrasion resistance or the like) can be ensured, and the solubility with the active energy ray curable monomer (described later) is also excellent.

The α,β-unsaturated carboxylic acids (b) contain, as an essential component, α,β-unsaturated dicarboxylic acids.

Examples of the α,β-unsaturated dicarboxylic acids include a carboxylic acid having two carboxyl groups in one molecule and having an unsaturated bond between an α-carbon and a β-carbon of at least one carboxyl group, and an anhydride thereof.

To be specific, examples of the α,β-unsaturated dicarboxylic acids include fumaric acid, maleic acid, maleic anhydride, itaconic acid, itaconic anhydride, citraconic acid, citraconic anhydride, mesaconic acid, and glutaconic acid.

These α,β-unsaturated dicarboxylic acids can be used alone or in combination of two or more.

As the α,β-unsaturated dicarboxylic acids, in view of mechanical strength, glossiness, and durability (abrasion resistance or the like), preferably, a fumaric acid, a maleic acid, and a maleic anhydride are used, more preferably, a fumaric acid and a maleic anhydride are used, further more preferably, a maleic anhydride is used.

The α,β-unsaturated carboxylic acids (b) can contain, as an optional component, α,β-unsaturated monocarboxylic acids.

An example of the α,β-unsaturated monocarboxylic acids includes a carboxylic acid having one carboxyl group in one molecule and having an unsaturated bond between an α-carbon and a β-carbon of the carboxyl group.

To be specific, examples of the α,β-unsaturated monocarboxylic acids include acrylic acid and methacrylic acid (hereinafter, acrylic and methacrylic may be generally referred to as (meth)acrylic).

These α,β-unsaturated monocarboxylic acids can be used alone or in combination of two or more.

The content ratio of the 4-unsaturated monocarboxylic acids is within a range that does not damage the excellent effect of the present invention, and to be specific, in view of glossiness and productivity of the cured film (described later), the content ratio of the α,β-unsaturated monocarboxylic acids with respect to the total amount of the α,β-unsaturated carboxylic acids (b) is, for example, 3 mass % or less, preferably 1 mass % or less, more preferably 0 mass %.

To be specific, when the α,β-unsaturated monocarboxylic acids are excessively used, there may be a case where the glossiness of the cured film (described later) cannot be sufficiently ensured. Thus, in view of glossiness of the cured film (described later), the content ratio of the α,β-unsaturated monocarboxylic acids with respect to the total amount of the α,β-unsaturated carboxylic acids (b) is 1 mass % or less.

Furthermore, when the α,β-unsaturated monocarboxylic acids (for example, (meth)acrylic acid or the like) are used, though the details are described later, in the production of the rosin-modified unsaturated polyester resin (A), the reaction needs to be carried out in two steps. Also, in the α,β-unsaturated monocarboxylic acids, self-polymerization is easily processed by radical reaction, so that strict management of the reaction conditions is required. Thus, in view of productivity, the α,β-unsaturated carboxylic acids (b) preferably do not contain the α,β-unsaturated monocarboxylic acids.

In the α,β-unsaturated carboxylic acids (b), the content ratio of the α,β-unsaturated dicarboxylic acids with respect to the total amount of the 4-unsaturated carboxylic acids (b) is, for example, 97 mass % or more, preferably 99 mass % or more, more preferably 100 mass %.

That is, in view of productivity, particularly preferably, the α,β-unsaturated carboxylic acids (b) consist of the α,β-unsaturated dicarboxylic acids.

The content ratio of the α,β-unsaturated carboxylic acids (b) with respect to 100 parts by mass of the total amount of the material component is, for example, 1 part by mass or more, preferably 3 parts by mass or more, more preferably 5 parts by mass or more, and for example, 98 parts by mass or less, preferably 50 parts by mass or less, more preferably 30 parts by mass or less.

When the content ratio of the α,β-unsaturated carboxylic acids (b) is within the above-described range, excellent glossiness, mechanical strength, and durability (abrasion resistance or the like) can be ensured.

The mass ratio (the α,β-unsaturated carboxylic acids (b)/the rosins (a)) of the α,β-unsaturated carboxylic acids (b) with respect to the rosins (a) is, for example, 0.10 or more, preferably 0.20 or more, more preferably 0.28 or more, further more preferably 0.35 or more, and for example, 10 or less, preferably 3 or less, more preferably 2 or less.

When the mass ratio of the α,β-unsaturated carboxylic acids (b) with respect to the rosins (a) is within the above-described range, excellent glossiness, mechanical strength, and durability (abrasion resistance or the like) can be ensured.

The polyols (c) are a compound having two or more hydroxyl groups in one molecule. The polyols (c) contain, as an essential component, a trihydric or more alcohol.

The trihydric or more alcohol is a compound having three or more hydroxyl groups in one molecule, and examples thereof include trihydric alcohols such as glycerine, 1,1,1-trimethylolethane, 1,1,1-trimethylolpropane (hereinafter, may be simply referred to as a trimethylolpropane), trioxyisobutane, 1,2,3-butanetriol, 1,2,3-pentanetriol, 2,3,4-pentanetriol, and 1,2,5-hexanetriol; tetrahydric alcohols such as pentaerythritol; pentahydric or more alcohols such as dipentaerythritol, glucose, sucrose, and sorbitol; and furthermore, alkylene oxide (ethylene oxide, propylene oxide, or the like) adducts thereof.

These trihydric or more alcohols can be used alone or in combination of two or more.

As the trihydric or more alcohol, in view of reactivity and easy availability, preferably, a trihydric alcohol and a tetrahydric alcohol are used, more preferably, a trihydric alcohol is used, further more preferably, a glycerine and a trimethylolpropane are used, particularly preferably, a glycerine is used.

The polyol (c) can contain, as an optional component, a dihydric or less alcohol.

The dihydric or less alcohol is a compound having one or more and two or less hydroxyl groups in one molecule, and examples thereof include monohydric alcohols such as methanol, ethanol, propanol, and isopropanol; dihydric alcohols such as ethylene glycol, 1,2-propanediol, 1,3-propanediol, 1,3-butanediol, 1,4-butanediol, neopentyl glycol, 1,5-pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, and bisphenol F; and furthermore, alkylene oxide (ethylene oxide, propylene oxide, or the like) adducts thereof.

These dihydric or less alcohols can be used alone or in combination of two or more.

As the dihydric or less alcohol, preferably, a dihydric alcohol is used, more preferably, a 1,6-hexanediol is used.

The content ratio of the dihydric or less alcohol is within a range that does not damage the excellent effect of the present invention, and to be specific, in view of glossiness and misting resistance, the content ratio of the dihydric or less alcohol with respect to the total amount of the polyols (c) is, for example, 10 mass % or less, preferably 5 mass % or less, more preferably 0 mass %. The content ratio of the trihydric or more alcohol with respect to the total amount of the polyols (c) is, for example, 90 mass % or more, preferably 95 mass % or more, more preferably 100 mass %.

In other words, in view of glossiness and misting resistance, particularly preferably, the polyols (c) consist of the trihydric or more alcohol.

The content ratio of the polyols (c) with respect to 100 parts by mass of the total amount of the material component is, for example, 1 part by mass or more, preferably 5 parts by mass or more, more preferably 10 parts by mass or more, and for example, 98 parts by mass or less, preferably 60 parts by mass or less, more preferably 40 parts by mass or less.

When the content ratio of the polyols (c) is within the above-described range, excellent misting resistance and storage stability can be achieved, and the cured film having excellent mechanical strength, glossiness, and durability (abrasion resistance or the like) can be obtained.

The material component of the rosin-modified unsaturated polyester resin (A) can contain carboxylic acids (d) excluding the α,β-unsaturated carboxylic acids (the above-described (b)) (hereinafter, referred to as other carboxylic acids (d)) as needed.

Examples of the other carboxylic acids (d) include a carboxylic acid having one or more carboxyl groups in one molecule and without having an unsaturated bond between an α-carbon and a β-carbon of all of the carboxyl groups, and an anhydride thereof. To be more specific, examples thereof include monobasic carboxylic acids without having an unsaturated bond between an α-carbon and a β-carbon, and polybasic carboxylic acids without having an unsaturated bond between an α-carbon and a β-carbon.

Examples of the monobasic carboxylic acid without having an unsaturated bond between an α-carbon and a β-carbon include aliphatic monobasic carboxylic acids such as acetic acid, propionic acid, butyric acid, valeric acid, caproic acid, lauric acid, stearic acid, 2-ethylhexanoic acid, and cyclohexanoic acid and aromatic monobasic carboxylic acids such as benzoic acid, methylbenzoic acid, para-t-butylbenzoic acid, orthobenzoylbenzoic acid, and naphthoic acid.

These monobasic carboxylic acids without having an unsaturated bond between an α-carbon and a β-carbon can be used alone or in combination of two or more.

As the monobasic carboxylic acid without having an unsaturated bond between an α-carbon and a β-carbon, preferably, an aromatic monobasic carboxylic acid is used, more preferably, a benzoic acid and a para-t-butylbenzoic acid are used.

Examples of the polybasic carboxylic acid without having an unsaturated bond between an α-carbon and a β-carbon include dibasic carboxylic acids such as oxalic acid, malonic acid, succinic acid, glutaric acid, adipic acid, suberic acid, azelaic acid, sebacic acid, dodecanedioic acid, tetradecanedioic acid, hexadecanedioic acid, phthalic acid, isophthalic acid, terephthalic acid, tetrahydrophthalic acid, oxalacetic acid, methylmalonic acid, dimethylmalonic acid, methylsuccinic acid, 2,2-dimethylsuccinic acid, methylglutaric acid, dimethylglutaric acid, diglycol acid, 1,3-acetonedicarboxylic acid, ketoglutaric acid, cyclopropane-1,1-dicarboxylic acid, cylobutane-1,1-dicarboxylic acid, cyclohexane-1,1-dicarboxylic acid, 2-oxoadipic acid, 4-oxoheptanedioic acid, 5-oxoazelaic acid, phenylenedioxydiacetic acid, indane-2,2-dicarboxylic acid, naphthalene-2,6-dicarboxylic acid, naphthalene-2,7-dicarboxylic acid, and cyclohexanedicarboxylic acid and anhydrides thereof and tribasic or more carboxylic acids such as trimellitic acid and pyromellitic acid and anhydrides thereof.

These polybasic carboxylic acids without having an unsaturated bond between an α-carbon and a β-carbon can be used alone or in combination of two or more.

As the polybasic carboxylic acid without having an unsaturated bond between an α-carbon and a β-carbon, preferably, a dibasic carboxylic acid and an anhydride thereof are used, more preferably, a phthalic acid, an anhydride of a tetrahydrophthalic acid, and an adipic acid are used.

Examples of the other carboxylic acids (d) include animal and plant fatty acids containing an aliphatic monobasic carboxylic acid such as coconut oil fatty acid, soybean oil fatty acid, and palm kernel oil fatty acid.

These other carboxylic acids (d) can be used alone or in combination of two or more.

When the material component contains the other carboxylic acids (d) (carboxylic acids (d) excluding the α,β-unsaturated carboxylic acids), the content ratio thereof with respect to 100 parts by mass of the total amount of the material component is, for example, 5 parts by mass or more, preferably 10 parts by mass or more, and for example, 70 parts by mass or less, preferably 50 parts by mass or less.

When the content ratio of the other carboxylic acids (d) is within the above-described range, excellent misting resistance and storage stability can be achieved, and the cured film having excellent mechanical strength, glossiness, and durability (abrasion resistance or the like) can be obtained.

By allowing the material component containing the rosins (a), the α,β-unsaturated carboxylic acids (b), and the polyols (c) (and furthermore, if necessary, the other carboxylic acids (d)) to react (being subjected to esterification reaction), the rosin-modified unsaturated polyester resin (A) can be obtained.

The reaction method is not particularly limited, and for example, the above-described material component is mixed and heated under the presence of a solvent as needed.

The solvent is not particularly limited, and examples thereof include organic solvents including petroleum hydrocarbon solvents such as hexane and mineral spirit; aromatic hydrocarbon solvents such as benzene, toluene, and xylene; ketone solvents such as acetone, methyl ethyl ketone, methyl isobutyl ketone, diisobutyl ketone, and cyclohexanone; ester solvents such as methyl acetate, ethyl acetate, butyl acetate, γ-butyrolactone, and propylene glycol monomethyl ether acetate; and non-protonic polar solvents such as N,N-dimethylformamide, N,N-dimethylacetamide, dimethylsulfoxide, N-methylpyrrolidone, and pyridine.

These solvents can be used alone or in combination of two or more. The mixing ratio of the solvent is not particularly limited, and appropriately set in accordance with its purpose and use.

For example, by heating the material component under the presence of a solvent capable of exhibiting azeotropy with water (for example, azeotropic dehydrating agent such as xylene and toluene), esterification reaction is caused, and water produced by the reaction can be distilled off. Also, after the completion of the reaction, the solvent may be removed as needed. Also, for example, by heating the material component under the absence of a solvent, the esterification reaction is caused, and water to be produced can be distilled off by a known method.

In the reaction, an esterification catalyst can be also added as needed.

The esterification catalyst is not particularly limited, and examples thereof include organic sulfonic acids such as benzenesulfonic acid, p-toluenesulfonic acid, p-dodecylbenzenesulfonic acid, methanesulfonic acid, and ethanesulfonic acid; mineral acids such as sulfuric acid and hydrochloric acid; metal catalysts such as tetrabutyl zirconate, tetraisopropyl titanate, tetraisobutyl titanate, aluminum oxide, titanium oxide, magnesium oxide, magnesium hydroxide, magnesium acetate, calcium oxide, calcium hydroxide, calcium acetate, zinc oxide, and zinc acetate; trifluoromethyl sulfuric acid; and trifluoromethyl acetic acid.

These esterification catalysts can be used alone or in combination of two or more.

The addition ratio of the esterification catalyst is not particularly limited, and appropriately set in accordance with its purpose and use.

As the reaction conditions, for example, under an inert gas atmosphere and an atmospheric pressure, the reaction temperature is, for example, 150° C. or more, preferably 200° C. or more, and for example, 280° C. or less, preferably 250° C. or less. The reaction time is, for example, 4 hours or more, preferably 6 hours or more, and for example, 20 hours or less, preferably 15 hours or less.

In the above-described reaction, the mixing method of the material component is not particularly limited, and the above-described material component may be collectively blended, or may be sequentially blended. In view of productivity, preferably, the above-described material is collectively blended.

When the material component contains, as an optional component (α,β-unsaturated monocarboxylic acids), an acrylic acid and/or a methacrylic acid (hereinafter, generally referred to as a (meth)acrylic acid), preferably, first, a component excluding the (meth)acrylic acid reacts (first step reaction), and thereafter, the obtained reaction product is mixed with the (meth)acrylic acid to react (second step reaction).

In this case, as the reaction conditions in the first step reaction, in the same manner as the description above, for example, under an inert gas atmosphere and an atmospheric pressure, the reaction temperature is, for example, 150° C. or more, preferably 200° C. or more, and for example, 280° C. or less, preferably 250° C. or less. The reaction time is, for example, 4 hours or more, preferably 6 hours or more, and for example, 20 hours or less, preferably 15 hours or less.

As the reaction conditions in the second step reaction, for example, under an inert gas atmosphere and an atmospheric pressure, the reaction temperature is, for example, 90° C. or more, preferably 95° C. or more, and for example, 120° C. or less, preferably 110° C. or less. The reaction time is, for example, 8 hours or more, preferably 10 hours or more, and for example, 20 hours or less, preferably 15 hours or less.

In the above-described second step reaction, preferably, a polymerization inhibitor is blended so as to prevent self-polymerization of the (meth)acrylic acid. Examples thereof include hydroquinone, methoxyphenol, methylhydroquinone, 2-tertiary-butylhydroquinone, p-benzoquinone, tertiary-butyl-p-benzoquinone, and phenothiazine. These polymerization inhibitors can be used alone or in combination of two or more. The mixing ratio of the polymerization inhibitor is not particularly limited, and appropriately set in accordance with its purpose and use.

As the reaction product of the material component containing the rosins (a), the α,β-unsaturated carboxylic acids (b), and the polyols (c) (and furthermore, the other carboxylic acids (d) as needed), the rosin-modified unsaturated polyester resin (A) is obtained.

In the rosin-modified unsaturated polyester resin (A), the mole ratio of the unsaturated bond based on the α,β-unsaturated carboxylic acids (b) calculated based on the material component is, for example, 0.50 mol/kg or more, preferably 0.80 mol/kg or more, and for example, 2.00 mol/kg or less, preferably 1.90 mol/kg or less.

The mole ratio of the unsaturated bond is calculated from the charged ratio of the material component by the following formula.

Mole ratio of unsaturated bond=[mole number (mol) of α,β-unsaturated carboxylic acids (*b*)]/[total mass (kg) of material component]

When the mole ratio of the unsaturated bond is above the above-described lower limit, the content ratio of the unsaturated bond based on the α,β-unsaturated carboxylic acids (b) in the rosin-modified unsaturated polyester resin (A) is relatively large, so that the reaction point (cross-linking point) with the active energy ray curable monomer (described later) is relatively large. Thus, the cured film having excellent mechanical strength (hardness) can be obtained. When the mole ratio of the unsaturated bond is below the above-described upper limit, excellent storage stability can be ensured.

The weight average molecular weight (GPC measurement with standard polystyrene calibration) of the rosin-modified unsaturated polyester resin (A) is, for example, 5000 or more, preferably 10000 or more, and for example, 100000 or less, preferably 70000 or less.

The acid value of the rosin-modified unsaturated polyester resin (A) is, for example, 1.0 mgKOH/g or more, preferably 2.0 mgKOH/g or more, and for example, 20 mgKOH/g or less, preferably 10 mgKOH/g or less.

The resin for an active energy ray curable ink can contain, in addition to the rosin-modified unsaturated polyester resin (A), a known additive as needed.

Examples of the additive include fillers, thickeners, blowing agents, antioxidants, light-resistant stabilizers, heat-resistant stabilizers, and flame retardants.

These additives can be used alone or in combination of two or more. The addition amount and the timing of the addition of the additive are not particularly limited, and appropriately set in accordance with its purpose and use.

In the resin for an active energy ray curable ink, the rosins (a) used as the material component contain the stabilization-treated rosin at the above-described lower limit (90 mass %) or more. In the stabilization-treated rosin, a double bond used in the Diels-Alder reaction is reduced, so that when the rosins (a) contain a relatively large amount of stabilization-treated rosin, the addition of the α,β-unsaturated dicarboxylic acid (b) with respect to the rosins (a) is suppressed. As a result, the α,β-unsaturated dicarboxylic acid (b) is introduced into a main chain of the rosin-modified unsaturated polyester resin (A). Thus, a relatively large amount of unsaturated bond based on the α,β-unsaturated dicarboxylic acid (b) is introduced into the rosin-modified unsaturated polyester resin (A).

Furthermore, as the material component, the α,β-unsaturated dicarboxylic acid (b) and the trihydric or more alcohol are used in the rosin-modified unsaturated polyester resin (A), and the mole ratio of the unsaturated bond of the rosin-modified unsaturated polyester resin (A) is adjusted within a predetermined range.

As a result, according to the above-described resin for an active energy ray curable ink, the improvement of the misting resistance can be achieved, and the cured film having excellent mechanical strength, glossiness, and durability (abrasion resistance or the like) can be obtained.

Thus, the resin for an active energy ray curable ink is preferably used in the production of the composition for an active energy ray curable ink (hereinafter, may be referred to as a varnish) and the active energy ray curable ink (hereinafter, may be referred to as an ink).

The composition for an active energy ray curable ink (varnish) contains the above-described resin for an active energy ray curable ink and the active energy ray curable monomer.

The active energy ray curable monomer is a photopolymerizable multifunctional compound having one or more photopolymerizable groups that are copolymerizable with the above-described resin for an active energy ray curable ink by the irradiation of an active energy ray, and examples thereof include photopolymerizable monofunctional compound having one photopolymerizable group in one molecule and photopolymerizable multifunctional compound having two or more photopolymerizable groups in one molecule.

Examples of the photopolymerizable monofunctional compound include 2-hydroxyethyl (meth)acrylate, lauryl (meth)acrylate, stearyl (meth)acrylate, cyclohexyl (meth) acrylate, isooctyl (meth)acrylate, isomyristyl (meth)acrylate, isostearyl (meth)acrylate, isobornyl (meth)acrylate, ethoxy-diethylene glycol (meth)acrylate, 2-ethylhexyl-carbitol (meth)acrylate, neopentyl glycol benzoate (meth)acrylate, nonylphenoxypolyethylene glycol (meth)acrylate, epichlorohydrin (ECH)-modified phenoxy (meth)acrylate, phenoxyethyl (meth)acrylate, paracumylphenolethylene oxide-modified (meth)acrylate, vinylpyrrolidone, vinylcaprolactam, and acryloylmorpholine.

Examples of the photopolymerizable multifunctional compound include photopolymerizable bifunctional compound having two photopolymerizable groups in one molecule, photopolymerizable trifunctional compound having three photopolymerizable groups in one molecule, photopolymerizable tetrafunctional compound having four photopolymerizable groups in one molecule, photopolymerizable pentafunctional compound having five photopolymerizable groups in one molecule, and photopolymerizable hexafunctional compound having six photopolymerizable groups in one molecule.

Examples of the photopolymerizable bifunctional compound include alkylene glycol di(meth)acrylate such as ethylene glycol di(meth)acrylate, propylene glycol di(meth) acrylate, and neopentyl glycol di(meth)acrylate; polyalkylene glycol di(meth)acrylate such as diethylene glycol di(meth)acrylate, tetraethylene glycol di(meth)acrylate, dipropylene glycol di(meth)acrylate, and tripropylene glycol di(meth)acrylate; 1,4-butanediol di(meth)acrylate; 1,6-hexanediol di(meth)acrylate; 1,9-nonanediol di(meth)acrylate; dicyclopentadiene di(meth)acrylate; neopentyl glycol adipate di(meth)acrylate; hydroxypivalic acid neopentyl glycol di(meth)acrylate; tricyclodecane dimethanol di(meth) acrylate; dicyclopentanyl di(meth)acrylate; petaerythritol di(meth)acrylate; bisphenol A ethylene oxide (EO)-addition diacrylate; caprolactone-modified dicyclopentenyl di(meth) acrylate; ethylene oxide-modified phosphate di(meth)acrylate; allyl cyclohexyl di(meth)acrylate, isocyanurate di(meth)acrylate or alkylene oxide modified product thereof; divinylbenzene; butanediol-1,4-divinyl ether; cyclohexane dimethanol divinyl ether; diethylene glycol divinyl ether; dipropylene glycol divinyl ether dipropylene glycol divinyl ether; hexane diol divinyl ether; triethylene glycol divinyl ether; phenyl glycidyl ether acrylate hexamethylene diisocyanate urethane prepolymer (trade name: "AH-600", manufactured by KYOEISHA CHEMICAL CO., LTD.); and phenyl glycidyl ether acrylate toluene diisocyanate urethane prepolymer (trade name: "AT-600", manufactured by KYOEISHA CHEMICAL CO., LTD.).

Examples of the photopolymerizalbe trifunctional compound include trimethylolpropane tri(meth)acrylate, pentaerythritol tri(meth)acrylate, tris(acryloxyethyl) isocyanurate or alkylene oxide modified product thereof, and tri (meth)acrylate of isocyanurate alkylene oxide modified product.

Examples of the photopolymerizable tetrafunctional compound include ditrimethylolpropane tetra(meth)acrylate and pentaerythritol tetra(meth)acrylate or alkylene oxide modified product thereof.

Examples of the photopolymerizable pentafunctional compound include dipentaerythritol penta(meth)acrylate or alkylene oxide modified product thereof.

Examples of the photopolymerizable hexafunctional compound include dipentaerythritol hexa(meth)acrylate, pentaerythritol triacrylate hexamethylene diisocyanate urethane prepolymer (trade name: "UA-306H", manufactured by KYOEISHA CHEMICAL CO., LTD.), and caprolactone-modified dipentaerythritol hexa(meth)acrylate or alkylene oxide modified product thereof.

These active energy ray curable monomers can be used alone or in combination of two or more.

As the active energy ray curable monomer, preferably, in view of suppressing volatility, an active energy ray curable monomer having a boiling point of relatively high temperature (for example, 200° C. or more) is used, more preferably, a dipentaerythritol hexa(meth)acrylate and a trimethylolpropane tri(meth)acrylate are used.

To obtain the composition for an active energy ray curable ink (varnish), the preparation method is not particularly limited, and the resin for an active energy ray curable ink and the active energy ray curable monomer may be mixed.

As the content ratio of the resin for an active energy ray curable ink to the active energy ray curable monomer, the ratio of the resin for an active energy ray curable ink with respect to 100 parts by mass of the total amount of the resin for an active energy ray curable ink and the active energy ray curable monomer is, for example, 15 parts by mass or more, preferably 25 parts by mass or more, and for example, 80 parts by mass or less, preferably 75 parts by mass or less. The ratio of the active energy ray curable monomer with respect to 100 parts by mass of the total amount of the resin for an active energy ray curable ink and the active energy ray curable monomer is, for example, 20 parts by mass or more, preferably 25 parts by mass or more, and for example, 85 parts by mass or less, preferably 75 parts by mass or less.

The composition for an active energy ray curable ink (varnish) can contain a known additive as needed.

Examples of the additive include the above-described polymerization inhibitors, furthermore, fillers, thickeners, blowing agents, antioxidants, light-resistant stabilizers, heat-resistant stabilizers, and flame retardants.

These additives can be used alone or in combination of two or more. The addition amount and the timing of the addition of the additive are not particularly limited, and appropriately set in accordance with its purpose and use.

The composition for an active energy ray curable ink (varnish) is preferably used in the production of the active energy ray curable ink.

To be specific, the active energy ray curable ink contains the above-described composition for an active energy ray curable ink (varnish) and a pigment.

The pigment is not particularly limited, and examples thereof include inorganic pigment and organic pigment.

Examples of the inorganic pigment include chrome yellow, zinc yellow, Prussian blue, barium sulfate, cadmium red, titanium oxide, zinc white, red iron oxide, alumina white, calcium carbonate, ultramarine blue, carbon black, graphite, aluminum powder, and Bengala. These inorganic pigments can be used alone or in combination of two or more.

Examples of the organic pigment include soluble azo pigments such as β-naphthol pigment, β-oxynaphthoic acid pigment, β-oxynaphthoic acid anilide pigment, acetoacetic acid anilide pigment, and pyrazolone pigment; insoluble azo pigments such as β-naphthol pigment, β-oxynaphthoic acid anilide pigment, acetoacetic acid anilide monoazo pigment, acetoacetic acid anilide disazo pigment, and pyrazolone pigment; phthalocyanine pigments such as copper phthalocyanine blue, halogenated (chlorination or bromination) copper phthalocyanine blue, sulfonation copper phthalocyanine blue, and metal free phthalocyanine; and polycyclic pigments and heterocyclic pigments such as quinacridone pigment, dioxazine pigment, threne pigment (pyranthrone, anthanthrone, indanthrone, anthrapyrimidine, flavanthrone, thioindigo-based, anthraquinone-based, perinone-based, perylene-based pigment, or the like), isoindolinone pigment, metal complex pigment, and quinophthalone pigment. These organic pigments can be used alone or in combination of two or more.

These pigments can be used alone or in combination of two or more.

As the mixing ratio of the composition for an active energy ray curable ink (varnish) to the pigment, the ratio of the composition for an active energy ray curable ink (varnish) with respect to 100 parts by mass of the total amount of the composition for an active energy ray curable ink (varnish) and the pigment is, for example, 30 parts by mass or more, preferably 40 parts by mass or more, and for example, 95 parts by mass or less, preferably 90 parts by mass or less. The ratio of the pigment with respect to 100 parts by mass of the total amount of the composition for an active energy ray curable ink (varnish) and the pigment is, for example, 5 parts by mass or more, preferably 10 parts by mass or more, and for example, 70 parts by mass or less, preferably 60 parts by mass or less.

The above-described active energy ray curable monomer can be further blended in the active energy ray curable ink as needed.

The mixing amount of the active energy ray curable monomer blended at the time of the preparation of the active energy ray curable ink with respect to 100 parts by mass of the total amount of the composition for an active energy ray curable ink (varnish) and the pigment is, for example, 3 parts by mass or more, preferably 5 parts by mass or more, and for example, 45 parts by mass or less, preferably 35 parts by mass or less.

A known photopolymerization initiator can be further blended in the active energy ray curable ink as needed.

The photopolymerization initiator is not particularly limited, and examples thereof include 2,2-dimethoxy-1,2-diphenylethane-1-one, 1-hydroxycyclohexylphenylketone, 1-cyclohexylphenylketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-(4-methylthiophenyl)-2-morpholinopropane-1-one, 2-benzyl-2-dimethylamino-1-(4-morpholinophenyl)-butanone-1, bis(2,4,6-trimethylbenzoyl)-phenylphosphine oxide, 2,4,6-trimethylbenzoyl-diphenyl-phosphine oxide, 4-methylbenzophenone, benzophenone, and 2-hydroxy-1-{4-[4-(2-hydroxy-2-methylpropionyl)-benzyl]phenyl}-2-methyl-propane-1-one.

These photopolymerization initiators can be used alone or in combination of two or more.

The mixing amount of the photopolymerization initiator with respect to 100 parts by mass of the total amount of the composition for an active energy ray curable ink (varnish) and the pigment is, for example, 0.5 parts by mass or more, preferably 1.0 part by mass or more, and for example, 20 parts by mass or less, preferably 15 parts by mass or less.

The active energy ray curable ink can contain a known additive as needed.

Examples of the additive include curing accelerators (cobalt naphthenate or the like), furthermore, fillers, thickeners, blowing agents, antioxidants, light-resistant stabilizers, heat-resistant stabilizers, and flame retardants.

These additives can be used alone or in combination of two or more. The addition amount and the timing of the addition of the additive are not particularly limited, and appropriately set in accordance with its purpose and use.

The resin for an active energy ray curable ink, the composition for an active energy ray curable ink containing the resin for an active energy ray curable ink, and furthermore, the active energy ray curable ink containing the composition for an active energy ray curable ink have excellent misting resistance and storage stability, and are capable of obtaining the cured film having excellent mechanical strength, glossiness, and durability (abrasion resistance or the like).

To be specific, to obtain the cured film, after the composition for an active energy ray curable ink or the active energy ray curable ink are applied to a substrate by a known method, the active energy ray is irradiated thereto to cure.

The substrate is not particularly limited, and examples thereof include uncoated paper such as wood free paper; coated paper such as fine coated paper, art paper, coating paper, lightweight coating paper, and cast-coating paper; paperboard such as white paperboard and coated cardboard; synthetic paper; aluminum vapor deposition paper; and plastic sheet.

The application method is not particularly limited, and a known printing method such as screen printing, offset printing, flexo printing, and roll printing is used.

Examples of the active energy ray include ultraviolet ray and electron ray.

When the curing is carried out by the ultraviolet ray, for example, an ultraviolet ray irradiation device having a xenon lamp, a high pressure mercury vapor lamp, a metal halide lamp, or the like is used as a light source. The irradiation amount of the ultraviolet ray, the light amount of the ultraviolet ray irradiation device, the arrangement of the light source, or the like are appropriately adjusted as needed. To be specific, when the high pressure mercury vapor lamp is used, for example, the substrate to which the composition for an active energy ray curable ink or the active energy ray curable ink are applied is conveyed at a conveyance speed of 5 to 50 m/min with respect to one light of luminous intensity of about 80 to 1000 W/cm$^2$. When the curing is carried out by the electron ray, the substrate to which the coating agent is applied is conveyed at, for example, a conveyance speed of 5 to 50 m/min with an electron ray accelerator having an acceleration voltage of 10 to 300 kV.

By the irradiation of the active energy ray, the composition for an active energy ray curable ink or the active energy ray curable ink is cross-linked and cures. As a result, as a cured product of the active energy ray curable ink, the cured film is obtained.

The obtained cured film is the cured product of the above-described composition for an active energy ray curable ink or the cured product of the above-described active energy ray curable ink, so that it has excellent mechanical strength, glossiness, and durability (abrasion resistance or the like).

Thus, the resin for an active energy ray curable ink, the composition for an active energy ray curable ink containing the resin for an active energy ray curable ink, and furthermore, the active energy ray curable ink containing the composition for an active energy ray curable ink and the cured film thereof are preferably used in, for example, a printing method such as lithography, letterpress printing, intaglio printing, and screen printing so as to obtain various printed matters including various printed matters for packaging such as printed matters for form and cartoon paper, various plastic printed matters, printed matters for stickers and labels, art printed matters, and metal printed matters.

EXAMPLES

Next, the present invention is described based on Examples and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Example 1

While a nitrogen gas was blown into a four-neck flask equipped with a stirrer, a reflux condenser including a water separator, and a thermometer, 7.0 parts of disproportionated rosin (trade name: G-100F, manufactured by Harima Chemicals Group, Inc.), 35.0 parts of para-t-butylbenzoic acid, 13.0 parts of maleic anhydride, 13.0 parts of phthalic acid, and 32.0 parts of trimethylolpropane were mixed therein to be subjected to dehydration condensation at 230° C. for about 8 hours, so that a resin for an active energy ray curable ink (hereinafter, abbreviated as a resin) 1 having an acid value of 8.0 mgKOH/g or less was obtained.

The obtained resin 1 (30.0 parts), 69.9 parts of dipentaerythritol hexaacrylate (DPHA), and 0.1 parts of hydroquinone were mixed to be heated and melted at about 110° C., so that a composition for an active energy ray curable ink (hereinafter, referred to as a varnish) 1 was obtained.

Furthermore, 55.0 parts of the obtained varnish 1, 20.0 parts of neutral carbon black (CB, pigment, manufactured by Mitsubishi Chemical Corporation, RCF #52), 19.7 parts of trimethylolpropane triacrylate (TMPTA), 5.0 parts of IRGACURE 907 (photopolymerization initiator, 2-methyl-1-[4-(methylthio)phenyl]-2-morpholinopropane-1-one, manufactured by BASF SE), and 0.3 parts of cobalt naphthenate (desiccant) were mixed to be dispersed, so that the maximum particle size of the obtained mixture was 7.5 μm or less with a triple roll mill (manufactured by INOUE MFG, INC., S-43/4×11). In this manner, an active energy ray curable ink (hereinafter, referred to as an ink) 1 was obtained.

The mixing ratio of each of the components in the ink 1 was adjusted so that the tack value in 1 minute was 8.0 to 10.0 with an incometer (D-2, manufactured by Toyo Seiki Seisaku-sho, Ltd.) under the conditions of a roll temperature of 30° C. and 400 rpm.

Examples 2 to 7 and Examples 9 to 11

Resins 2 to 7 and resins 9 to 11 were obtained in the same manner as that of Example 1, except that the mixing ratio was changed to that shown in Table 1.

Also, varnishes 2 to 7 and varnishes 9 to 11 were obtained in the same manner as that of Example 1.

Furthermore, inks 2 to 7 and inks 9 to 11 were obtained in the same manner as that of Example 1.

Example 8

While a nitrogen gas was blown into a four-neck flask equipped with a stirrer, a reflux condenser including a water separator, and a thermometer, 29.0 parts of disproportionated rosin (trade name: G-100F, manufactured by Harima Chemicals Group, Inc.), 10.7 parts of maleic anhydride, 25.0 parts of benzoic acid, 11.3 parts of tetrahydrophthalic acid, and 23.6 parts of glycerine were mixed therein to be subjected to dehydration condensation at 230° C. for about 8 hours, so that an acid value of the resulting mixture was adjusted to 8.0 mgKOH/g or less. Thereafter, the mixture was cooled, and 0.1 parts of hydroquinone and 0.3 parts of acrylic acid were added thereto to react at 110° C. for about 12 hours, so that a resin 8 having an acid value of 8.0 mgKOH/g or less was obtained.

A varnish 8 was obtained in the same manner as that of Example 1.

Furthermore, an ink 8 was obtained in the same manner as that of Example 1.

Comparative Examples 1 to 2 and Comparative Examples 5 to 7

Resins 12 to 13 and resins 16 to 18 were obtained in the same manner as that of Example 1, except that the mixing ratio was changed to that shown in Table 2.

Also, varnishes 12 to 13 and varnishes 16 to 18 were obtained in the same manner as that of Example 1.

Furthermore, an ink 12 and inks 16 to 18 were obtained in the same manner as that of Example 1. The varnish 13 does not have sufficient storage stability (described later), so that an ink 13 using the varnish 13 was not prepared. The varnish 17 was geleated in 10 days, and it did not reach the usable level. However, the ink 17 was prepared so as to check the evaluation thereof as an ink.

Comparative Examples 3 and 4

Resins 14 and 15 were obtained in the same manner as that of Example 8, except that the mixing ratio was changed to that shown in Table 2.

Also, varnishes 14 to 15 were obtained in the same manner as that of Example 1.

Furthermore, inks 14 and 15 were obtained in the same manner as that of Example 1.

<Evaluation of Varnish>

Each of the varnishes obtained in Examples and Comparative Examples was evaluated by the following method.

(1) Storage Stability

The varnish was stored at about 60° C., and a presence or absence of gelation was visually confirmed. The reference of evaluation was as follows.

A: Gelation was not confirmed in one month.
B: Gelation was confirmed from 10 days or later.
C: Gelation was confirmed from 3 days or later.

It was judged that "A" was practically available based on the above-described reference.

<Evaluation of Ink>

Each of the inks obtained in Examples and Comparative Examples was evaluated by the following method.

(1) Gloss Value

Each of the inks of 0.4 mL was spread on an art paper with an entire surface roll of RI tester. Thereafter, by using an UV irradiation device (ESC-4011GX, manufactured by EYE GRAPHICS Co., Ltd.), an ultraviolet ray was irradiated under the conditions of a metal halide lamp of 80 W/cm and a conveyor speed of 24 m/min, so that the printed matter cured. The gloss value of the printed matter after curing was measured with a 60°-60° glossmeter (micro-TRI-gloss, manufactured by Taiyukizai Co., LTD.). It was judged that the gloss value of 60 or more in the test was defined as a high gloss value.

(2) Pencil Hardness

As for the printed matter after curing produced under the same conditions as those at the time of the measurement of the gloss value, the maximum hardness thereof at which the film of the printed matter was not separated with "uni" of Mitsubishi Pencil was evaluated in conformity with JIS K5600 (2007).

The reference of evaluation was as follows.
(Hard) 2H>H>F>HB>B>2B (Soft)

It was judged that "F" or more was practically available based on the above-described reference.

(3) Abrasion Resistance

As for the printed matter after curing produced under the same conditions as those at the time of the measurement of the gloss value, by using an S-shaped friction tester (manufactured by YASUDA SEIKI SEISAKUSHO, LTD.), a degree of rubbing off of the ink film on the surface of the printed matter was evaluated in 5 steps by reciprocating 40 times with a load of 1816 g in conformity with JIS K5701-1 (2000). The reference of evaluation was as follows.

5: By reciprocating 40 times, a degree of rubbing off was below 20%.
4: By reciprocating 40 times, a degree of rubbing off was 20% or more and below 40%.
3: By reciprocating 40 times, a degree of rubbing off was 40% or more and below 60%.
2: By reciprocating 40 times, a degree of rubbing off was 60% or more and below 80%.
1: By reciprocating 40 times, a degree of rubbing off was 80% or more.

It was judged that "3" or more was practically available based on the above-described reference.

(4) Misting Resistance

About 360 mL of each of the inks was taken out, and placed on an incometer (manufactured by Toyo Seiki Seisaku-sho, Ltd., D-2) so as to be uniform, and by rolling at 1200 rpm and a roll temperature of 30° C., the scattering state of the ink attached to a white pater placed on the front surface and the lower surface of the roll was visually confirmed, and evaluated in 5 steps. The reference of evaluation was as follows.

5: Scattering of the ink was almost none.
4: Scattering of the ink was slightly confirmed.
3: Scattering of the ink was confirmed, but practically available.
2: Scattering of the ink was largely confirmed.
1: Scattering of the ink was remarkably confirmed.

TABLE 1

| | | | | Ex. 1 Resin 1 | Ex. 2 Resin 2 | Ex. 3 Resin 3 | Ex. 4 Resin 4 | Ex. 5 Resin 5 | Ex. 6 Resin 6 | Ex. 7 Resin 7 | Ex. 8 Resin 8 | Ex. 9 Resin 9 | Ex. 10 Resin 10 | Ex. 11 Resin 11 |
|---|---|---|---|---|---|---|---|---|---|---|---|---|---|---|
| Mixing Formulation (parts by mass) | Rosins (a) | Stabilization-Treated Rosin | Disproportionated Rosin | 7.0 | — | 29.0 | 29.0 | 29.0 | 37.0 | 45.0 | 29.0 | 29.0 | 27.3 | 30.8 |
| | | | Hydrogenated Rosin | — | 29.0 | — | — | — | — | — | — | — | — | — |

TABLE 1-continued

| | | | Ex. 1 Resin 1 | Ex. 2 Resin 2 | Ex. 3 Resin 3 | Ex. 4 Resin 4 | Ex. 5 Resin 5 | Ex. 6 Resin 6 | Ex. 7 Resin 7 | Ex. 8 Resin 8 | Ex. 9 Resin 9 | Ex. 10 Resin 10 | Ex. 11 Resin 11 |
|---|---|---|---|---|---|---|---|---|---|---|---|---|---|
| | Non-Stabilization-Treated Rosin | Gum Rosin | — | — | — | — | — | — | — | — | — | 1.7 | — |
| α,β-unsaturated carboxylic acids (b) | Dicarboxylic Acid | Maleic Anhydride | 13.0 | — | 11.0 | 11.0 | 18.0 | 10.0 | 10.0 | 10.7 | 11.0 | 11.0 | 9.2 |
| | | Fumaric Acid | — | 6.0 | — | — | — | 10.0 | — | — | — | — | — |
| | | Maleic Acid | — | — | — | — | — | — | — | 10.0 | — | — | — |
| | Monocarboxylic Acid | Acrylic Acid | — | — | — | — | — | — | — | — | 0.3 | — | — |
| Other Carboxylic Acids (d) (Dibasic Acid) | | Phthalic Acid | 13.0 | — | — | — | 2.0 | — | 3.0 | — | — | — | — |
| | | Tetrahydrophthalic Anhydride | — | 16.0 | 11.4 | 10.4 | — | — | — | 11.3 | 11.4 | 11.4 | 11.4 |
| | | Adipic Acid | — | — | — | — | — | 2.0 | — | — | — | — | — |
| Other Carboxylic Acids (d) (Monobasic Acid) | | Benzoic Acid | — | 25.0 | 25.0 | 19.0 | 26.0 | 15.0 | 10.0 | 25.0 | 25.0 | 25.0 | 25.0 |
| | | Para-t-butyl Benzoic Acid | 35.0 | — | — | — | — | — | 2.0 | — | — | — | — |
| Polyols (c) | Trihydric Polyol | Glycerine | — | 14.0 | 23.6 | — | 25.0 | 13.0 | 20.0 | 23.6 | 21.3 | 23.6 | 23.6 |
| | | Trimethylolpropane | 32.0 | 10.0 | — | 30.6 | — | 13.0 | — | — | — | — | — |
| | Dihydric Polyol | 1,6-hexanediol | — | — | — | — | — | — | — | — | 2.3 | — | — |
| Polymerization Inhibitor | | Hydroquinone | — | — | — | — | — | — | — | — | 0.1 | — | — |
| | Total | | 100.0 | 100.0 | 100.0 | 100.0 | 100.0 | 100.0 | 100.0 | 100.0 | 100.0 | 100.0 | 100.0 |
| α,β-unsaturated carboxylic acids (b)/Rosins (a) Mass Ratio | | | 1.86 | 0.21 | 0.38 | 0.38 | 0.62 | 0.54 | 0.44 | 0.38 | 0.38 | 0.38 | 0.30 |
| Unsaturated Bond Ratio (mol/kg) | | | 1.33 | 0.52 | 1.12 | 1.12 | 1.84 | 1.88 | 1.88 | 1.13 | 1.12 | 1.12 | 0.94 |
| Dihydric Alcohol/Total Polyols (c) (mass %) | | | 0 | 0 | 0 | 0 | 0 | 0 | 0 | 0 | 9.7 | 0 | 0 |
| α,β-unsaturated monocarboxylic acid/α,β-unsaturated carboxylic acid (b) (mass %) | | | 0 | 0 | 0 | 0 | 0 | 0 | 0 | 0 | 2.7 | 0 | 0 |
| Stabilization-Treated Rosin/Rosins (a) (mass %) | | | 100 | 100 | 100 | 100 | 100 | 100 | 100 | 100 | 100 | 94 | 100 |

TABLE 2

| | | | | Comp. Ex. 1 Resin 12 | Comp. Ex. 2 Resin 13 | Comp. Ex. 3 Resin 14 | Comp. Ex. 4 Resin 15 | Comp. Ex. 5 Resin 16 | Comp. Ex. 6 Resin 17 | Comp. Ex. 7 Resin 18 |
|---|---|---|---|---|---|---|---|---|---|---|
| Mixing Formulation (parts by mass) | Rosins (a) | Stabilization-Treated Rosin | Disproportionated Rosin | 29.0 | 29.0 | 23.0 | 29.0 | 29.0 | — | 25.5 |
| | | | Hydrogenated Rosin | — | — | — | — | — | — | — |
| | | Non-Stabilization-Treated Rosin | Gum Rosin | — | — | — | — | — | 29.0 | 3.5 |
| | α,β-unsaturated carboxylic acids (b) | Dicarboxylic Acid | Maleic Anhydride | 3.0 | 21.0 | — | — | 11.0 | 11.0 | 11.0 |
| | | | Fumaric Acid | — | — | — | — | — | — | — |
| | | | Maleic Acid | — | — | — | — | — | — | — |
| | | Monocarboxylic Acid | Acrylic Acid | — | — | 4.0 | 8.5 | — | — | — |

TABLE 2-continued

|  |  | Comp. Ex. 1 Resin 12 | Comp. Ex. 2 Resin 13 | Comp. Ex. 3 Resin 14 | Comp. Ex. 4 Resin 15 | Comp. Ex. 5 Resin 16 | Comp. Ex. 6 Resin 17 | Comp. Ex. 7 Resin 18 |
|---|---|---|---|---|---|---|---|---|
| Other Carboxylic Acids (d) (Dibasic Acid) | Phthalic Acid | 10.0 | — | 22.0 | — | — | — | — |
|  | Tetrahydrophthalic Anhydride | — | — | — | 21.5 | 11.4 | 11.4 | 11.4 |
|  | Adipic Acid | 10.0 | — | — | — | — | — | — |
| Other Carboxylic Acids (d) (Monobasic Acid) | Benzoic Acid | 26.0 | 26.0 | 22.0 | 20.0 | 25.0 | 25.0 | 25.0 |
|  | Para-t-butyl Benzoic Acid | — | — | — | — | — | — | — |
| Polyols (c) | Trihydric Polyol Glycerine | 22.0 | 24.0 | — | 20.9 | — | 23.6 | 23.6 |
|  | Trimethylolpropane | — | — | 28.9 | — | — | — | — |
|  | Dihydric Polyol 1,6-hexanediol | — | — | — | — | 23.6 | — | — |
| Polymerization Inhibitor | Hydroquinone | — | — | 0.1 | 0.1 | — | — | — |
|  | Total | 100.0 | 100.0 | 100.0 | 100.0 | 100.0 | 100.0 | 100.0 |
| α,β-unsaturated carboxylic acids (b)/Rosins (a) Mass Ratio |  | 0.10 | 0.72 | 0.17 | 0.29 | 0.38 | 0.38 | 0.38 |
| Unsaturated Bond Ratio (mol/kg) |  | 0.31 | 2.14 | 0.56 | 1.18 | 1.12 | 1.12 | 1.12 |
| Dihydric Alcohol/Total Polyols (c) (mass %) |  | 0 | 0 | 0 | 0 | 100 | 0 | 0 |
| α,β-unsaturated monocarboxylic acid/α,β-unsaturated carboxylic acid (b) (mass %) |  | 0 | 0 | 100 | 100 | 0 | 0 | 0 |
| Stabilization-Treated Rosin/Rosins (a) (mass %) |  | 100 | 100 | 100 | 100 | 100 | 0 | 88 |

TABLE 3

|  |  | Ex. 1 Varnish 1 | Ex. 2 Varnish 2 | Ex. 3 Varnish 3 | Ex. 4 Varnish 4 | Ex. 5 Varnish 5 | Ex. 6 Varnish 6 | Ex. 7 Varnish 7 | Ex. 8 Varnish 8 | Ex. 9 Varnish 9 | Ex. 10 Varnish 10 | Ex. 11 Varnish 11 |
|---|---|---|---|---|---|---|---|---|---|---|---|---|
| Mixing Formulation (parts by mass) | Resin 1 | 30.0 | — | — | — | — | — | — | — | — | — | — |
|  | Resin 2 | — | 30.0 | — | — | — | — | — | — | — | — | — |
|  | Resin 3 | — | — | 30.0 | — | — | — | — | — | — | — | — |
|  | Resin 4 | — | — | — | 30.0 | — | — | — | — | — | — | — |
|  | Resin 5 | — | — | — | — | 30.0 | — | — | — | — | — | — |
|  | Resin 6 | — | — | — | — | — | 30.0 | — | — | — | — | — |
|  | Resin 7 | — | — | — | — | — | — | 30.0 | — | — | — | — |
|  | Resin 8 | — | — | — | — | — | — | — | 30.0 | — | — | — |
|  | Resin 9 | — | — | — | — | — | — | — | — | 30.0 | — | — |
|  | Resin 10 | — | — | — | — | — | — | — | — | — | 30.0 | — |
|  | Resin 11 | — | — | — | — | — | — | — | — | — | — | 30.0 |
|  | Resin 12 | — | — | — | — | — | — | — | — | — | — | — |
|  | Resin 13 | — | — | — | — | — | — | — | — | — | — | — |
|  | Resin 14 | — | — | — | — | — | — | — | — | — | — | — |
|  | Resin 15 | — | — | — | — | — | — | — | — | — | — | — |
|  | Resin 16 | — | — | — | — | — | — | — | — | — | — | — |
|  | Resin 17 | — | — | — | — | — | — | — | — | — | — | — |
|  | Resin 18 | — | — | — | — | — | — | — | — | — | — | — |
|  | DPHA | 69.9 | 69.9 | 69.9 | 69.9 | 69.9 | 69.9 | 69.9 | 69.9 | 69.9 | 69.9 | 69.9 |
|  | Hydroquinone | 0.1 | 0.1 | 0.1 | 0.1 | 0.1 | 0.1 | 0.1 | 0.1 | 0.1 | 0.1 | 0.1 |
| Storage Stability |  | A | A | A | A | A | A | A | A | A | A | A |

TABLE 4

| | | Comp. Ex. 1<br>Varnish 12 | Comp. Ex. 2<br>Varnish 13 | Comp. Ex. 3<br>Varnish 14 | Comp. Ex. 4<br>Varnish 15 | Comp. Ex. 5<br>Varnish 16 | Comp. Ex. 6<br>Varnish 17 | Comp. Ex. 7<br>Varnish 18 |
|---|---|---|---|---|---|---|---|---|
| Mixing Formulation<br>(parts by mass) | Resin 1 | — | — | — | — | — | — | — |
| | Resin 2 | — | — | — | — | — | — | — |
| | Resin 3 | — | — | — | — | — | — | — |
| | Resin 4 | — | — | — | — | — | — | — |
| | Resin 5 | — | — | — | — | — | — | — |
| | Resin 6 | — | — | — | — | — | — | — |
| | Resin 7 | — | — | — | — | — | — | — |
| | Resin 8 | — | — | — | — | — | — | — |
| | Resin 9 | — | — | — | — | — | — | — |
| | Resin 10 | — | — | — | — | — | — | — |
| | Resin 11 | — | — | — | — | — | — | — |
| | Resin 12 | 30.0 | — | — | — | — | — | — |
| | Resin 13 | — | 30.0 | — | — | — | — | — |
| | Resin 14 | — | — | 30.0 | — | — | — | — |
| | Resin 15 | — | — | — | 30.0 | — | — | — |
| | Resin 16 | — | — | — | — | 30.0 | — | — |
| | Resin 17 | — | — | — | — | — | 30.0 | — |
| | Resin 18 | — | — | — | — | — | — | 30.0 |
| | DPHA | 69.9 | 69.9 | 69.9 | 69.9 | 69.9 | 69.9 | 69.9 |
| | Hydroquinone | 0.1 | 0.1 | 0.1 | 0.1 | 0.1 | 0.1 | 0.1 |
| Storage Stability | | A | C | A | A | A | B | A |

TABLE 5

| | | Ex. 1<br>Ink 1 | Ex. 2<br>Ink 2 | Ex. 3<br>Ink 3 | Ex. 4<br>Ink 4 | Ex. 5<br>Ink 5 | Ex. 6<br>Ink 6 | Ex. 7<br>Ink 7 | Ex. 8<br>Ink 8 | Ex. 9<br>Ink 9 | Ex. 10<br>Ink 10 | Ex. 11<br>Ink 11 |
|---|---|---|---|---|---|---|---|---|---|---|---|---|
| Mixing Formulation<br>(parts by mass) | CB | 20.0 | 20.0 | 20.0 | 20.0 | 20.0 | 20.0 | 20.0 | 20.0 | 20.0 | 20.0 | 20.0 |
| | Varnish 1 | 55.0 | — | — | — | — | — | — | — | — | — | — |
| | Varnish 2 | — | 56.0 | — | — | — | — | — | — | — | — | — |
| | Varnish 3 | — | — | 54.0 | — | — | — | — | — | — | — | — |
| | Varnish 4 | — | — | — | 54.0 | — | — | — | — | — | — | — |
| | Varnish 5 | — | — | — | — | 53.0 | — | — | — | — | — | — |
| | Varnish 6 | — | — | — | — | — | 56.0 | — | — | — | — | — |
| | Varnish 7 | — | — | — | — | — | — | 58.0 | — | — | — | — |
| | Varnish 8 | — | — | — | — | — | — | — | 54.0 | — | — | — |
| | Varnish 9 | — | — | — | — | — | — | — | — | 55.0 | — | — |
| | Varnish 10 | — | — | — | — | — | — | — | — | — | 53.0 | — |
| | Varnish 11 | — | — | — | — | — | — | — | — | — | — | 53.0 |
| | Varnish 12 | — | — | — | — | — | — | — | — | — | — | — |
| | Varnish 14 | — | — | — | — | — | — | — | — | — | — | — |
| | Varnish 15 | — | — | — | — | — | — | — | — | — | — | — |
| | Varnish 16 | — | — | — | — | — | — | — | — | — | — | — |
| | Varnish 17 | — | — | — | — | — | — | — | — | — | — | — |
| | Varnish 18 | — | — | — | — | — | — | — | — | — | — | — |
| | TMPTA | 19.7 | 18.7 | 20.7 | 20.7 | 21.7 | 18.7 | 16.7 | 20.7 | 19.7 | 21.7 | 21.7 |
| | IRGACURE 907 | 5.0 | 5.0 | 5.0 | 5.0 | 5.0 | 5.0 | 5.0 | 5.0 | 5.0 | 5.0 | 5.0 |
| | Cobalt Naphthenate | 0.3 | 0.3 | 0.3 | 0.3 | 0.3 | 0.3 | 0.3 | 0.3 | 0.3 | 0.3 | 0.3 |
| Evaluation | Gloss Value | 62 | 72 | 77 | 63 | 73 | 68 | 66 | 60 | 68 | 67 | 73 |
| | Pencil Hardness | 2H | F | H | H | 2H | 2H | 2H | H | H | F | H |
| | Abrasion Resistance | 4 | 3 | 5 | 5 | 5 | 5 | 5 | 5 | 4 | 4 | 4 |
| | Misting Resistance | 4 | 4 | 5 | 5 | 5 | 5 | 5 | 5 | 3 | 5 | 5 |

TABLE 6

| | | Comp. Ex. 1<br>Ink 12 | Comp. Ex. 2<br>Ink 13 | Comp. Ex. 3<br>Ink 14 | Comp. Ex. 4<br>Ink 15 | Comp. Ex. 5<br>Ink 16 | Comp. Ex. 6<br>Ink 17 | Comp. Ex. 7<br>Ink 18 |
|---|---|---|---|---|---|---|---|---|
| Mixing Formulation<br>(parts by mass) | CB | 20.0 | No<br>Preparation | 20.0 | 20.0 | 20.0 | 20.0 | 20.0 |
| | Varnish 1 | — | | — | — | — | — | — |
| | Varnish 2 | — | | — | — | — | — | — |
| | Varnish 3 | — | | — | — | — | — | — |
| | Varnish 4 | — | | — | — | — | — | — |
| | Varnish 5 | — | | — | — | — | — | — |
| | Varnish 6 | — | | — | — | — | — | — |
| | Varnish 7 | — | | — | — | — | — | — |

TABLE 6-continued

| | | Comp. Ex. 1 Ink 12 | Comp. Ex. 2 Ink 13 | Comp. Ex. 3 Ink 14 | Comp. Ex. 4 Ink 15 | Comp. Ex. 5 Ink 16 | Comp. Ex. 6 Ink 17 | Comp. Ex. 7 Ink 18 |
|---|---|---|---|---|---|---|---|---|
| | Varnish 8 | — | | | | | | |
| | Varnish 9 | — | | | | | | |
| | Varnish 10 | — | | | | | | |
| | Varnish 11 | — | | | | | | |
| | Varnish 12 | 55.0 | | | | | | |
| | Varnish 14 | — | | 57.0 | | | | |
| | Varnish 15 | — | | — | 54.0 | | | |
| | Varnish 16 | — | | — | — | 59.0 | | |
| | Varnish 17 | — | | — | — | — | 53.0 | |
| | Varnish 18 | — | | — | — | — | — | 53.0 |
| | TMPTA | 19.7 | | 17.7 | 20.7 | 15.7 | 21.7 | 21.7 |
| | IRGACURE 907 | 5.0 | | 5.0 | 5.0 | 5.0 | 5.0 | 5.0 |
| | Cobalt Naphthenate | 0.3 | | 0.3 | 0.3 | 0.3 | 0.3 | 0.3 |
| Evaluation | Gloss Value | 69 | — | 56 | 54 | 63 | 60 | 59 |
| | Pencil Hardness | HB | — | F | F | HB | B | HB |
| | Abrasion Resistance | 1 | — | 3 | 3 | 1 | 3 | 3 |
| | Misting Resistance | 5 | — | 5 | 5 | 1 | 5 | 5 |

The details of the abbreviations in Tables are given in the following.

DPHA: dipentaerythritol hexaacrylate
TMPTA: trimethylolpropane triacrylate
CB: carbon black
IRGACURE 907: photopolymerization initiator, 2-methyl-1-(4-methylthiophenyl)-2-morpholinopropane-1-one, manufactured by BASF SE While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The resin for an active energy ray curable ink, the composition for an active energy ray curable ink, the active energy ray curable ink, and the cured film of the present invention are preferably used in various printed matters such as various printed matters for packaging, various plastic printed matters, printed matters for stickers and labels, art printed matters, and metal printed matters.

The invention claimed is:

1. A resin for an active energy ray curable ink containing a rosin-modified unsaturated polyester resin (A), wherein
the rosin-modified unsaturated polyester resin (A) is a reaction product of a material component containing rosins (a), α,β-unsaturated carboxylic acids (b), and polyols (c);
a mole ratio of an unsaturated bond based on the α,β-unsaturated carboxylic acids (b) with respect to the total amount of the material component is 0.50 mol/kg or more and 2.00 mol/kg or less;
the rosins (a) contain a stabilization-treated rosin at a ratio of 90 mass % or more with respect to the total amount of the rosins (a);
the stabilization-treated rosin is a hydrogenated rosin and/or a disproportionated rosin;
the α,β-unsaturated carboxylic acids (b) contain α,β-unsaturated dicarboxylic acids; and
the polyols (c) contain a trihydric or more alcohol.

2. The resin for an active energy ray curable ink according to claim 1, wherein
a content ratio of α,β-unsaturated monocarboxylic acids with respect to the total amount of the α,β-unsaturated carboxylic acids (b) is 3 mass % or less.

3. The resin for an active energy ray curable ink according to claim 1, wherein
a content ratio of a diol with respect to the total amount of the polyols (c) is 10 mass % or less.

4. The resin for an active energy ray curable ink according to claim 1, wherein
the α,β-unsaturated dicarboxylic acids are at least one compound selected from the group consisting of fumaric acid, maleic acid, and maleic anhydride.

5. The resin for an active energy ray curable ink according to claim 1, wherein
a mass ratio (the α,β-unsaturated carboxylic acids (b)/the rosins (a)) of the α,β-unsaturated carboxylic acids (b) with respect to the rosins (a) is 0.35 or more and 2 or less.

6. A composition for an active energy ray curable ink containing:
the resin for an active energy ray curable ink according to claim 1 and an active energy ray curable monomer.

7. An active energy ray curable ink containing:
the composition for an active energy ray curable ink according to claim 6 and a pigment.

8. A cured film being a cured product of the composition for an active energy ray curable ink according to claim 6.

9. A cured film being a cured product of the active energy ray curable ink according to claim 7.

* * * * *